J. W. WELLS.
WALL FITTING FOR COCKS.
APPLICATION FILED JULY 10, 1917. RENEWED MAY 6, 1919.
1,319,817.
Patented Oct. 28, 1919.
2 SHEETS—SHEET 1.
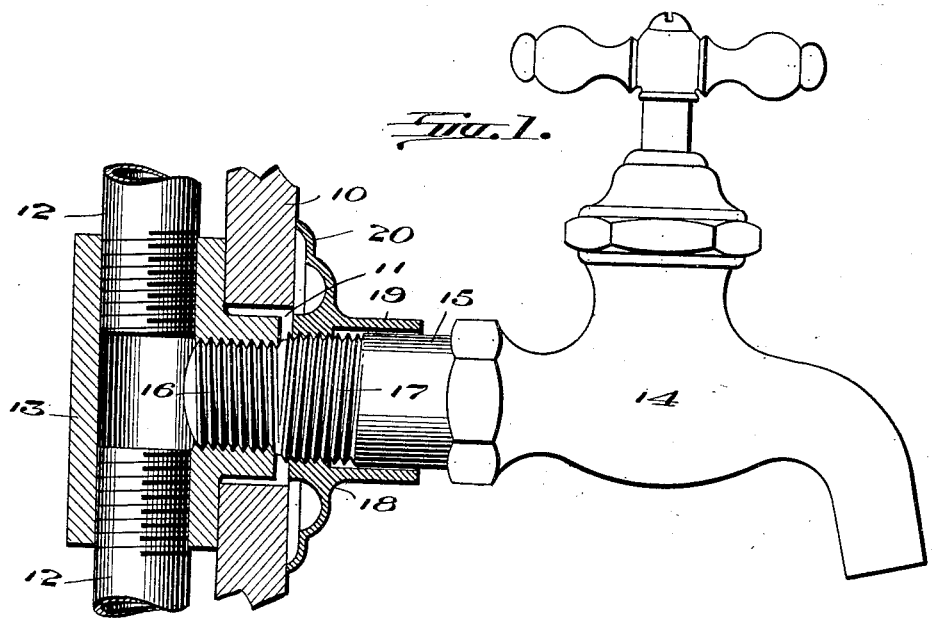
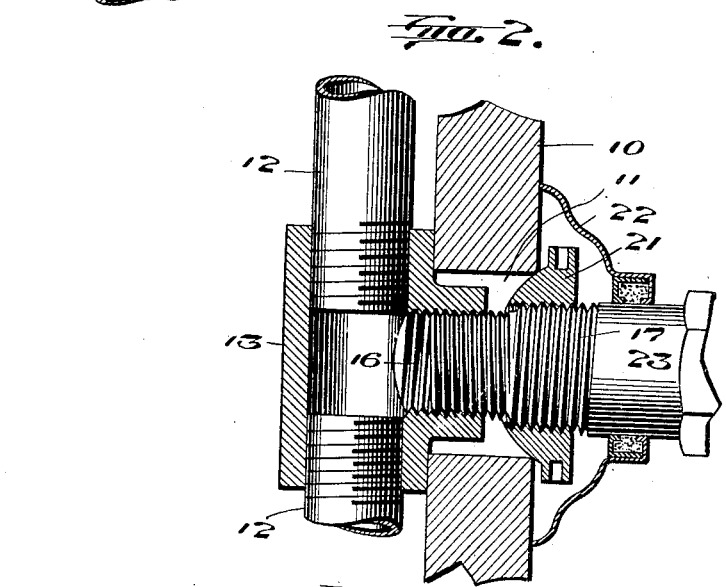

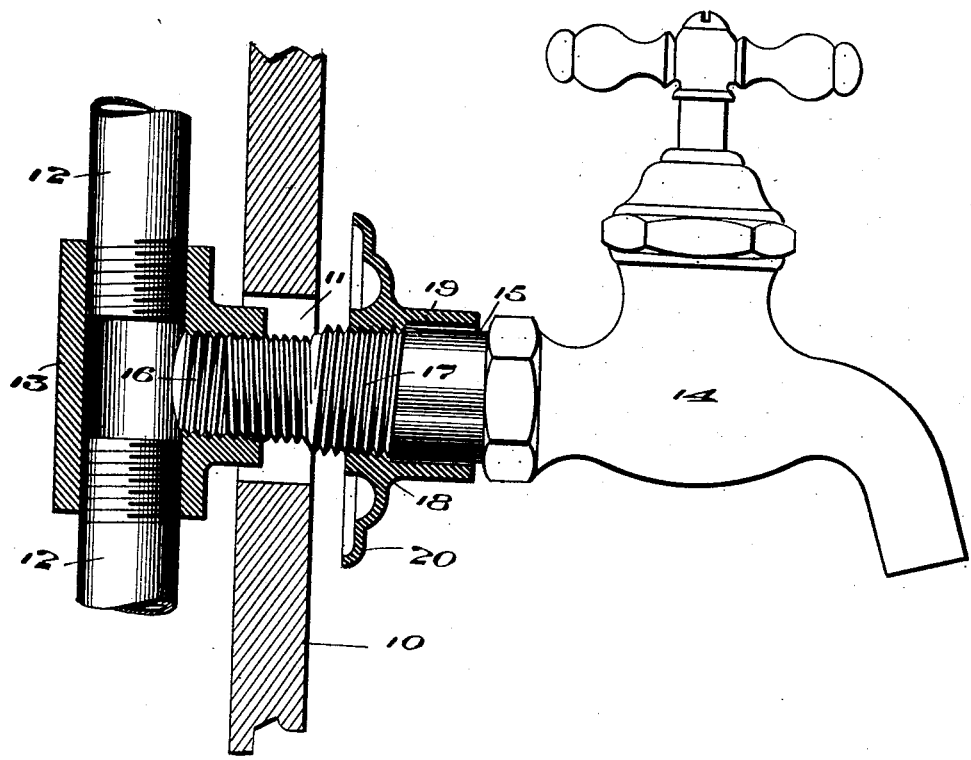

UNITED STATES PATENT OFFICE.

JEWEL W. WELLS, OF DECATUR, ILLINOIS, ASSIGNOR TO ADOLPH MUELLER, TRUSTEE, OF DECATUR, ILLINOIS.

WALL-FITTING FOR COCKS.

1,319,817.  Specification of Letters Patent.  Patented Oct. 28, 1919.

Application filed July 10, 1917, Serial No. 179,724. Renewed May 6, 1919. Serial No. 295,111.

*To all whom it may concern:*

Be it known that I, JEWEL W. WELLS, a citizen of the United States, residing at Decatur, in the county of Macon and State of Illinois, have invented new and useful Improvements in Wall-Fittings for Cocks, of which the following is a specification.

The present invention relates to fittings for cocks, and more particularly for cocks and faucets intended to be fitted through a backboard or panel to a supply pipe in the rear of the panel.

It has for its object to provide a fitting in which, upon setting up the cock or faucet through a suitable aperture in the wall of the panel, the escutcheon or finish plate, or front clamping nut, will automatically feed up against the wall panel and clamp the wall panel so that when the cock or faucet is brought to its final position the escutcheon plate or nut will be firmly set up in effective clamping position, and the necessity of turning that nut or escutcheon plate by means of tools ordinarily used will be done away with.

I accomplish this object by providing the shank of the faucet with two sets of threads adjacent each other, these threads being reversely cut, and one set being designed to engage the supply pipe T, or other fitting, while the other set, cut reversely relative to the first named set, is designed to engage the escutcheon or nut, which seats against and clamps the front of the backboard or panel.

This results, when the nut is turned, in drawing the supply pipe fitting snugly against the back of the panel, and at the same time feeding the escutcheon, mounted on reversely cut threads, in the opposite direction against the front of the panel.

In the drawings herewith I have illustrated two embodiments of my invention, in one of which the escutcheon is shown, and in the other of which the clamping nut is shown, but it will be understood that these drawings are simply illustrative and not restrictive, as other equivalent fittings may be used without departing from the spirit of my invention.

In the drawings:—

Figure 1 is a view in side elevation of a cock provided with my improvement, the wall panel and parts of the fitting being in section for clearness of illustration.

Fig. 2 is a sectional view of so much of a wall panel, supply pipe, and faucet shank as will illustrate my invention, this embodiment showing the use of a clamping nut in connection with the threaded faucet shank instead of the escutcheon shown in Fig. 1.

Fig. 3 is a perspective view of a form of clamping nut different from that shown in Fig. 2.

Fig. 4 is a view similar to Fig. 1, but showing the parts in their initial position just as they are about to be set up.

Referring to the drawings by numbers, like numbers indicating like parts in the several views, 10 indicates a wall board or panel of any suitable or desired type, having therethrough an aperture 11 for a faucet shank.

12 indicates any suitable supply pipe, that in the present instance being shown as provided with a T fitting 13 adapted to enter the aperture 11 in the panel 10.

The faucet 14 is provided with a shank 15 which is of usual construction, except with respect to its threaded portion. The threaded portion is provided with two sections, the section 16 at the rear being threaded in the usual manner, and adapted to engage the threaded aperture in the T fitting 13. The adjacent section 17 of the faucet shank 15 is reversely threaded, as shown, and in the embodiment illustrated in Fig. 1 is adapted to engage an escutcheon 18 which is threaded throughout a portion of its length, has a sleeve 19 adapted to house the faucet shank, and a finish flange 20 to engage the front of the panel 10. As shown in the present embodiment the threaded sections 16 and 17 are in stepped relation, or of different diameters, but it will be understood that I do not limit myself to this stepped relation, as a uniform diameter of shank might be used with the reversely threaded sections thereon.

In setting up this fitting, as will be seen best from Fig. 4, the escutcheon 18 is threaded onto the section 17 far enough to permit the threaded shank section 16 to engage the T 13. The threaded section 16 will then be entered in the threaded nib of the T 13, and the faucet screwed home. Immediately the faucet is turned far enough to engage the flange 20 of the escutcheon 18 with the face of the wall board or panel 10, the friction of the flange 20 on the wall board will be greater than the friction between the threads of the escutcheon and the threaded section 17, and continued rotation of the faucet 14 will, by reason of the reverse threads 17, force the escutcheon tightly against the front face of the panel, while the oppositely threaded section 16 will draw the T 13 against the back of the wall board or panel. In other words the parts will be brought from the position shown in full lines in Fig. 4 to the position shown in full lines in Fig. 1.

From this it will be seen that the setting up of this fitting is absolutely automatic so far as clamping the supply pipe fitting and the escutcheon against the panel is concerned, and the necessity of utilizing wrenches, or other tools, or even manipulating the escutcheon plate with the fingers, is unnecessary, for the reversely arranged threads will effect the opposite movement of the T 13 and the escutcheon, and clamp them firmly in position.

I am aware that it has been proposed to provide a faucet shank with threaded sections in which the threads are cut in the same direction, and not reversely placed as in my improvement, but experience has shown that where the threads are cut in the same direction there is not that automatic clamping of the parts which is secured by my improvement. The reason for this is that with threads which are not reversely cut, immediately the escutcheon engages the wall panel the amount of friction between the flange and panel is greater than that between the threads of the faucet shank and the threaded bore of the escutcheon, and the result is that the faucet shank simply screws through the escutcheon as a fixed part, and does not effect any clamping thereof against the back plate.

I am also aware that it is not broadly new to cut reverse threads on rotating parts, for this has been done in vises, clutches, and the like, but so far as I am aware I am the first to provide a faucet with reversely cut threads, so as to effect automatically and simultaneously the setting up of a supply fitting and an escutcheon plate on opposite sides of a wall board or panel without the necessity of utilizing wrenches or other tools to bring the parts to their final clamped position.

In Fig. 2 I have shown the use of my improvement in connection with a clamping nut instead of a clamping escutcheon plate. In said figure the parts are the same as heretofore described, except that in place of the escutcheon plate I provide a clamping nut 21 having a spherical rear face to engage and center in the aperture 11 in the panel, this clamping nut being preferably covered by means of an escutcheon plate 22 frictionally mounted on the unthreaded portion 23 of the faucet shank, and which frictionally held escutcheon may be pushed into contact with the panel when the parts have been brought to clamped position.

In place of the spherical faced nut 21 I may use that type of nut shown in Fig. 3, which has a plain clamping face, and sets flatly against the front of the panel or wall board.

Such departures from the embodiments herein disclosed as are within the range of mechanical skill I deem, of course, to be within the purview of my invention.

I claim:

1. In a fitting of the class described, the combination with an apertured support or panel, of a supply pipe having a fitting on one side of said panel, clamping means on the other side of said panel, and a faucet provided with reversely placed engaging means to engage and move in opposite directions said fitting and said clamping means.

2. In a fitting of the class described, the combination with an apertured support or panel, of a supply pipe having a screw-threaded fitting on one side of said panel, clamping means on the other side of said panel, and a faucet provided with reversely placed screw threads to engage and move in opposite directions said supply pipe and said clamping means.

3. In a fitting of the class described, the combination with an apertured support or panel, of a supply pipe having a T on one side of said panel, an escutcheon on the other side of said panel, and a faucet provided with reversely placed screw threads to engage and clamp said supply pipe and said escutcheon against said panel.

4. In a fitting of the class described, the combination with an apertured support or panel, of a supply pipe on one side of said panel, clamping means on the other side of said panel, and a faucet having a stepped and reversely threaded shank to engage and move in opposite directions said supply pipe and said clamping means against said panel.

5. In a fitting of the class described, the combination with an apertured support or panel, of a supply pipe having a threaded T on one side of said panel, an escutcheon on the opposite side of said panel, and a faucet having a right hand threaded section engaging said T and a left hand threaded section engaging said escutcheon, said T and escutcheon being moved in opposite directions to clamp or release said panel between them when the faucet is rotated.

In testimony whereof I have hereunto set my hand in presence of two subscribing witnesses.

JEWEL W. WELLS.

Witnesses:
J. W. SIMPSON,
DEAN B. GORHAM.

Copies of this patent may be obtained for five cents each, by addressing the "Commissioner of Patents, Washington, D. C."